3,285,874
SATURATED HYDROCARBON POLYMERS STABILIZED WITH 4,4-METHYLENEBIS(2-METHYL-6-TERTIARY BUTYL)PHENOL
Thomas H. Coffield, Farmington, Mich., and Allen H. Filbey, Baton Rouge, La., assignors to Ethyl Corporation, New York, N.Y., a corporation of Virginia
No Drawing. Continuation of application Ser. No. 738,014, May 27, 1958, now Patent No. 3,250,741, dated May 10, 1966. This application Jan. 19, 1966, Ser. No. 521,537
3 Claims. (Cl. 260—45.95)

This application is a continuation of application Serial No. 738,014, filed May 27, 1958, now U.S. 3,250,741.

This invention relates to the sabilization of saturated hydrocarbon polymers against oxidative deterioration.

It is an object of this invention to provide a superior oxidation inhibitor for saturated hydrocarbon polymers. A further object is to provide improved saturated hydrocarbon polymer compositions containing an oxidation inhibitor.

The above and other objects of this invention are accomplished by a composition of matter comprising a solid saturated hydrocarbon synthetic polymer derived by polymerization of an aliphatic monoolefin hydrocarbon compound having four carbon atoms and a small antioxidant quantity, up to about 5 percent, of 4,4'methylenebis(2-methyl-6-tert butylphenol). This inhibitor has the formula

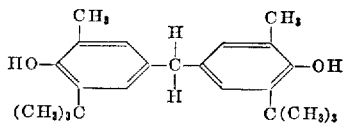

The saturated hydrocarbon synthetic polymers which achieve greatly enhanced oxidative stability by the practice of this invention include polymers obtained from the polymerization of a hydrocarbon monoolefin having four carbon atoms. Examples of such monomers include butylene and isobutylene. Thus, the polymers are homopolymers and copolymers of butylene and isobutylene.

Polybutenes are hydrocarbon polymers derived from the polymerization of olefins containing four carbon atoms. This polymerization can be accomplished by a great variety of methods which lead to products of diverse properties. Polybutenes of any nature may advantageously be utilized for preparing compositions according to the present invention. The polymers of butenes which are employed may, for example, be similar to those which may be obtained by polymerizing a butene in a basic aqueous medium and in the presence of polymerization-favoring quantities of oxygen under relatively high pressures in excess of 500 or 1,000 atmospheres at temperatures between 150 and 275° C. Or, if desired, they may be similar or identical to the polymers which may be obtained under relatively low pressures of 1 to 100 atmospheres using such catalysts to polymerize the olefin as aluminum alkyls or mixtures of strong reducing agents and compounds of Group IV–B, V–B and VI–B metals of the periodic system; chromium oxide on silicated alumina; hexavalent molybdenum compounds; and charcoal supported nickel-cobalt. The polyolefin which results from these various polymerization processes may have a molecular weight in the range from 1300 to over 1,000,000 depending on the particular conditions of polymerization employed.

There are several methods available for preparing the inhibited hydrocarbon polymer compositions of this invention. Thus, the blending of the 4,4'-methylenebis(2-methyl-6-tert-butylphenol) with a polymer such as, for example, polybutylene, may be carried out on open rolls, on internal mixers or may be accomplished by mixing with extrusion. It is also possible to prepare concentrated batches of the polymer containing excessive amounts of 4,4'-methylenebis(2-methyl-6-tert-butylphenol) and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyisobutylenes will not melt at low temperatures and tend to stick to the rolls at high temperatures. The 4,4'-methylenebis(2-methyl-6-tert-butylphenol) may be initially mixed with the polymer in the dried salts or it may be first dissolved in a suitable solvent, then sprayed on the polymer and milled in.

Examples of the hydrocarbon polymer compositions of this invention, prepared as described above, follow. All parts and percentages are by weight in these examples.

*Example I*

To 1,000 parts of polybutylene produced by oxygen catalyzed reaction under a pressure of 20,000 atmospheres and having an average molecular weight of 40,000 is added and mixed 2 parts of 4,4'-methylenebis(2-methyl-6-tert-butylphenol). The resulting composition has greatly increased oxidative stability.

*Example II*

With 200 parts of polyisobutylene having an average molecular weight of 100,000 is blended 1.0 part of 4,4'-methylenebis(2-methyl-6-tert-butylphenol).

*Example III*

To a master batch of high molecular weight polybutylene having an average molecular weight of about 1,000,000, a tensile strength of 6,700 p.s.i., and a Shore D hardness of 74 is added 5 percent of 4,4'-methylenebis(2-methyl-6-tert-butylphenol).

*Example IV*

To a polybutylene having a high degree of crystallinity (about 93 percent) is added 0.005 *percent* 4,4'-methylenebis(2-methyl-6-tert-butylphenol) and the resulting product has better stability characteristics.

*Example V*

To a polyisobutylene polymer having an average molecular weight of 35,000 is added sufficient 4,4'-methylenebis(2-methyl-6-tert-butylphenol) to give a composition containing 0.03 percent of the antioxidant. The composition has improved antioxidant properties due to the presence of 4,4'-methylenebis(2-methyl-6-tert-butylphenol).

In addition to 4,4'-methylenebis(2-methyl-6-tert-butylphenol) the hydrocarbon polymers of this invention may contain other compounding and coloring additives, including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

The antioxidant of this invention is conveniently prepared by the reaction of 2-methyl-6-tert-butylphenol with formaldehyde in the presence of an alkali metal hydroxide catalyst and using a monohydric alcohol as a solvent. This process is exemplified by the following example.

*Example VI*

In a reaction vessel equipped with stirring means, condensing means, thermometer and reagent introducing means was placed a solution of 6.6 parts of potassium hydroxide dissolved in 400 parts of isopropanol. To this solution was added 164 parts of 2-methyl-6-tert-butylphenol and 45.3 parts of 37 percent formalin solution while maintaining an atmosphere of nitrogen in the reaction vessel. The reaction mixture was heated for 2½ hours, cooled and poured into 1500 parts of cold water. The organic material was extracted with ethyl ether, the ether solution dried over magnesium sulfate and evaporated leaving a pale yellow liquid which slowly solidified to give a white crystalline product, melting point 96.5 to 98.5° C. This product was 4,4'-methylenebis(2-methyl-6-tert-butylphenol). Calculated for $C_{23}H_{32}O_2$: carbon, 81.1 percent; hydrogen, 9.47 percent. Found: carbon, 80.6 percent; hydrogen, 9.3 percent. The compound is soluble in water and has varying degrees of solubility in various organic solvents.

We claim:
1. A polyolefin derived from the polymerization of a monoolefin containing four carbon atoms, said polyolefin containing a small antioxidant quantity, up to 5 weight percent, of 4,4'-methylenebis(2-methyl-6-tert-butylphenol).
2. The composition of claim 1 wherein said polyolefin is a polybutylene.
3. The composition of claim 1 wherein said polyolefin is a polyisobutylene.

No references cited.

LEON J. BERCOVITZ, *Primary Examiner.*
H. E. TAYLOR, *Assistant Examiner.*